United States Patent [19]

Haynes et al.

[11] 4,171,403

[45] Oct. 16, 1979

[54] GLASS FIBER COATED WITH A HYDROXY-ETHYLATED STARCH, A TERTIARY AMINE ETHERIFIED STARCH, AND A METHYL METHACRYLATE LATEX POLYMER OR CO-POLYMER

[75] Inventors: Harold L. Haynes, Granville; Albert R. Morrison, Newark, both of Ohio

[73] Assignee: Owens-Corning Fiberglas Corporation, Toledo, Ohio

[21] Appl. No.: 763,391

[22] Filed: Jan. 28, 1977

[51] Int. Cl.² .......................... B32B 9/00; D02G 3/00
[52] U.S. Cl. ................................. 428/392; 57/250; 260/17.4 ST; 428/389
[58] Field of Search ............... 428/375, 378, 392, 389; 260/17.4 ST; 57/250, 258; 536/50

[56] References Cited

U.S. PATENT DOCUMENTS

| | | | |
|---|---|---|---|
| 2,381,587 | 8/1945 | Griffin et al. | 260/17.4 ST |
| 2,993,872 | 7/1961 | Gagnon | 260/17.4 ST X |
| 3,227,192 | 1/1966 | Griffiths | 260/17.4 ST |
| 3,284,179 | 11/1966 | Eilerman | 260/176.4 ST X |
| 3,481,771 | 12/1969 | Doering | 428/392 |
| 3,664,855 | 5/1972 | Morrison et al. | 428/375 X |
| 3,767,604 | 10/1973 | Hjermstad et al. | 260/17.4 ST |
| 3,769,248 | 10/1973 | Kovats | 260/17.4 ST |
| 3,793,065 | 2/1974 | Morrison et al. | 260/17.4 ST X |
| 3,870,547 | 3/1975 | Workman | 428/392 X |
| 3,928,666 | 12/1975 | Morrison et al. | 428/392 X |
| 3,971,871 | 7/1976 | Haynes et al. | 428/392 |
| 4,009,317 | 2/1977 | Chase et al. | 428/392 X |

*Primary Examiner*—Lorraine T. Kendell
*Attorney, Agent, or Firm*—Ronald C. Hudgens; Philip R. Cloutier; James B. Wilkens

[57] ABSTRACT

A starch-based size composition comprising a hydroxy-ethylated starch film former, a tertiary amine etherified starch film former and a methyl-methacrylate latex is disclosed. When a size composition of this invention is employed in the production of glass fiber textile yarns, the resulting yarns exhibit excellent processing properties.

5 Claims, No Drawings

GLASS FIBER COATED WITH A HYDROXY-ETHYLATED STARCH, A TERTIARY AMINE ETHERIFIED STARCH, AND A METHYL METHACRYLATE LATEX POLYMER OR CO-POLYMER

This invention relates to the production of glass fiber textile products.

In one of its more specific aspects, this invention relates to an improved starch-based size composition for glass fibers employed to produce glass fiber yarns for the production of textile fabric.

The production of glass fiber textile fabric is well known in the art. Generally, individual glass fibers are coated at forming with a starch-based size and the sized fibers are brought together into a bundle or strand. The strand is then wound onto a forming package and thereafter strands are unwound from several forming packages and twisted onto a twist package to form a yarn. A plurality of twisted yarns can be unwound from twist packages and twisted together to form a plied yarn. A plurality of yarns are then wrapped on a cylinder to produce a beam, which beam is removed to a loom and woven into fabric.

A usual step in the production of woven glass fiber textile products, for both decorative and other textile markets, is the removal of the forming size prior to finishing the fabric with a treatment tailored for its end application. Starches are not employed as permanent coatings and usually must be heat cleaned or burned off of the glass fibers prior to applying a finish coating.

Although prior art starch-based sizes are numerous, weavers are continually searching for forming sizes which impart better processing properties to the resulting sized yarns.

This invention provides a starch-based size composition which, when employed on glass fibers used to produce yarns for glass fiber textile fabric, results in yarns which exhibit reduced levels of size powder, improved yarn tenacity, low levels of yarn fuzz and fabric which can be heat cleaned more efficiently at lower temperatures.

According to this invention, there is provided an aqueous size composition comprising: (1) a hydroxyethylated starch film former, (2) a tertiary amine etherified starch film former, and (3) a methyl-methacrylate latex.

Also, according to this invention, there is provided at least one glass fiber at least a portion of the surface of which is in contact with a residue formed by removing water from an aqueous composition comprising: (1) a hydroxy-ethylated starch, (2) a tertiary amine etherified starch, and (3) a methyl-methacrylate latex.

Preferably, the size compositions according to this invention will also comprise lubricants, emulsifiers, inhibitors, and optionally, non-starch film formers.

In a preferred embodiment, the size composition of this invention will comprise: (4) a first nonionic lubricant, (5) a second nonionic lubricant, (6) a cationic lubricant, (7) a first emulsifier, (8) a second emulsifier, (9) an inhibitor, and (10) a non-starch film former.

The size composition of this invention, will be comprised, preferably of the following components:

(1) a hydroxy-ethylated starch film former in an amount within the range of from about 0.5 to about 4 percent by weight. As used herein, percent by weight will be understood to mean by weight of the aqueous size composition.

A particularly suitable hydroxy-ethylated starch is designated "Superlose 2116," commercially available from Celanese Chemical Co. "Superlose 2116" is a hydroxy-ethylated potato starch.

(2) a tertiary amine etherified starch film former in an amount within the range of from about 0.5 to about 4 percent by weight.

A particularly suitable tertiary amine etherified starch is designated "Cato 75," commercially available from National Starch Products, Inc.

"Cato 75" and suitable substitutes therefore are described in U.S. Pat. No. 2,813,093. "Cato 75" is based on corn starch. Another suitable tertiary amine etherified starch is designated "Catosize 67" also available from National Starch Products, Inc.

(3) a methyl-methacrylate latex in an amount within the range of from about 0.5 to about 2 percent by weight.

Any suitable methyl-methacrylate latex can be employed. A particularly suitable methyl-methacrylate latex is described in U.S. application Ser. No. 415,590, now U.S. Pat. No. 4,009,317.

(4) a first nonionic lubricant in an amount within the range of from about 0.5 to about 2 percent by weight.

Any suitable paraffin wax having a melting point of from about 125° to about 130° F. can be employed as a first nonionic lubricant. A particularly suitable first nonionic lubricant is designated "Shellwax 100," commercially available from Shell Chemical Company. "Shellwax 100" is a paraffin wax having a melting point of about 125° F. and an average molecular weight of 350.

(5) a second nonionic lubricant in an amount within the range of from about 0.5 to about 2 percent by weight.

Any suitable hydrogenated vegetable oil can be employed as the second nonionic lubricant. A particularly suitable hydrogenated vegetable oil is designated "Hydrol 110," commercially available from Durkee Industrial Foods. "Hydrol 110" is a hydrogenated coconut oil. Other suitable hydrogenated vegetable oils include hydrogenated corn oil and hydrogenated cottonseed oil.

(6) a cationic lubricant in an amount within the range of from about 0.15 to about 1 percent by weight.

Any suitable cationic lubricant can be employed. A particularly suitable cationic lubricant is designated "Lubesize K-12," commercially available from Owens-Corning Fiberglas. "Lubesize K-12" is the reaction product of tetraethylene pentamine and stearic acid in a molar ratio of 1 to 2, respectively. "Lubesize K-12" has a pH of 5.8, a melting point range of from about 54° to about 59° C. and an acetic acid content of 12.4 percent.

(7) a first emulsifier in an amount within the range of from about 0.05 to about 2 percent by weight.

Any suitable first emulsifier can be employed. A particularly suitable first emulsifier is designated "Glycosperse S-20," commercially available from Glyco Chemical, Inc. "Glycosperse S-20" is a polyoxyethylene 20 sorbitan monostearate.

(8) a second emulsifier in an amount within the range of from about 0.05 to about 2 percent by weight.

Any suitable second emulsifier can be employed. A particularly suitable second emulsifier being designated "Glycomul S," commercially available from Glyco Chemical, Inc. "Glycomul S" is sorbitan monostearate.

(9) an inhibitor in an amount of about 0.00001 percent by weight.

Any suitable inhibitor can be employed. A particularly suitable inhibitor is designated "Amerstat 285," commercially available from Drew Chemical Corporation. "Amerstat 285" is an organo-tin inhibitor.

(10) a non-starch film former in an amount up to about 0.5 percent by weight.

Suitable non-starch film formers employable in the size compositions of this invention include gelatin, animal glue, water soluble acelates and the like. A particularly suitable non-starch film former is designated "Gelvatol 20–30," commercially available from Monsanto Company. "Gelvatol 20–30" is a polyvinyl alcohol having a weight average molecular weight of about 10,000.

Demineralized water will comprise the balance of the size composition.

The size composition of this invention is prepared by conventional methods such as that described below. It can be applied to any glass fibers conventionally employed to produce textile fabric being applied during the forming operation using any suitable applicator such that the fibers possess, upon drying, a solids content within the range of from about 0.7 to about 1.7 weight percent, based upon loss on ignition.

Having described the basic ingredients of the invention, reference is now made to the following examples which are provided by way of illustration and not by way of limitation of the practice of the invention.

EXAMPLE I

This example demonstrates the best mode for producing a size composition of this invention.

About 200 gallons of demineralized water, 150 pounds of "Superlose 2116" and 50 pounds of "Cato 75" were added to a slurry tank with agitation. The resulting starch slurry was heated to about 140° to 150° F.

About 100 gallons of demineralized water and about 5 pounds of "Gelvatol 20–30" were added to a main mix tank with agitation.

The contents of the slurry tank were cooked in a jet cooker at about 217° F. and charged into the main mix tank.

About 40 pounds of "Shellwax 100," about 45 pounds of "Hydrol 110," about 6.5 pounds of "Glycosperse S-20," about 6 pounds of "Glycolmul S" and about 10.3 pounds of "Lubesize K-12" were added to a premix tank with agitation and heated to about 170° to 180° F.

About 20 gallons of demineralized water at a temperature of about 180° to 190° F. were added to the contents of the premix tank and agitated slowly until the emulsion thickened. The agitator speed was increased and addition of demineralized water continued until the emulsion inverted and became fluid.

The contents of the premix tank were then homogenized into the main mix tank and the contents of the main mix tank were allowed to cool to about 145° to 160° F.

Next, about 40 pounds of a methyl-methacrylate latex and about 50 ml of "Amerstat 285" were added to the contents of the main mix tank with agitation.

The contents of the main mix tank were recovered as a size composition of the invention and had a percent mix solids of from about 6.35 to about 6.65 and a percent strand solids of from about 1.0 to about 1.2.

EXAMPLE II

The example is included for comparative purposes. A prior art size composition was prepared following the procedure taught in U.S. Pat. No. 3,461,090 (Example I).

EXAMPLE III

The size compositions of Examples I and II, were separately applied to continuous filament glass fibers having diameters within the range of from 0.00023 to 0.00028 inch using a conventional size applicator. The filaments were collected into strands, the strands twisted, and the twisted strands collected to form yarns. The yarns were tested and found to have the properties shown in Table I.

TABLE I

| YARN PROPERTIES | | |
|---|---|---|
| Size Composition Of: | EXAMPLE I | EXAMPLE II |
| (1) Size Burn-off Temperature - °F. (Thermal Gravimetric Analysis)(TGA)[a] | 1000 | 1030 |
| (2) Twist Fuzz Index[b] | 1.10 | 1.20 |
| (3) Size Powder - grams/100 lbs. of yarn[c] | .01 | .02 |
| (4) Tenacity - grams/denier (ASTM - D-2256-75) | 5.72 | 5.43 |

[a] A sufficient sample of the size composition was weighed into a small platinum crucible and yielded about 9 milligrams of residue after drying. The residue was subjected to increasingly higher temperatures at a predetermined rate while the weight of the residue was continuously recorded as a function of time and, therefore, temperature. The resulting TGA curve was employed to determine the relative temperature (F.°) at which the size was adequately removed from the glass fibers.

[b] 100 forming packages were placed on a twist frame and twisted on to twist packages. Each twist package was visually inspected for the number of broken filaments and classified as follows: Class I, 0–9 broken filaments, Class II, 10–24 broken filaments, Class III, 25–49 broken filaments, Class IV, more than 50 broken filaments. Twist Fuzz Index was determined by using the following formula:

$$\text{TWIST FUZZ INDEX} = \frac{(1 \times \text{No. of packages in Class I}) + (2 \times \text{No. of packages in Class II}) + \text{Etc.}}{\text{Total No. of twist packages}}$$

[c] Amount of powder collected by running the yarn through a pair of off-set reeds which create friction on the yarn while changing yarn direction to about 60°.

It will be seen from the above data that the size compositions of this invention act to improve burn-off temperature, fuzz, size powder, and tenacity of yarns as compared to prior art sized yarns.

It will be evident from the foregoing that various modifications can be made to the present invention. Such, however, are considered as being within the scope of the invention.

What is claimed is:

1. At least one glass fiber having at least a portion of the surface thereof coated with a residue formed by removing water from an aqueous composition comprising: (1) a hydroxy-ethylated starch film former, (2) a tertiary amine etherified starch film former, and (3) a methylmethacrylate latex.

2. The glass fiber of claim 1 comprising a first and a second nonionic lubricant, said first nonionic lubricant comprising a hydrogenated vegetable oil and said second nonionic lubricant comprising a paraffin wax having a melting point within the range of from about 125° to about 130° F.

3. The glass fiber of claim 2 comprising in percent by weight of said aqueous composition said hydroxyethylated starch film former in an amount within the range of from about 0.5 to about 4 percent, said tertiary amine etherified starch film former in an amount within the range of from about 0.5 to about 4 percent, said methyl-methacrylate latex in an amount within the range of from about 0.5 to about 2 percent by weight of the aqueous composition, said hydrogenated vegetable oil in an amount within the range of from about 0.5 to about 2 percent and said paraffin wax in an amount within the range of from about 0.5 to about 2 percent.

4. The glass fiber of claim 3 comprising in percent by weight of said aqueous composition a cationic lubricant in an amount within the range of from about 0.15 to about 1 percent, a first emulsifier in an amount within the range of from about 0.05 to about 2 percent, a second emulsifier in an amount within the range of from about 0.05 to about 2 percent, a non-starch film former in an amount up to about 0.5 percent by weight and an inhibitor in an amount of about 0.00001 percent.

5. At least one glass fiber at least a portion of the surface of which is in contact with a residue formed by removing water from an aqueous composition comprising in percent by weight of said aqueous composition a hydroxy ethylated potato starch in an amount of about 3.1 percent, a tertiary amine etherified corn starch in an amount of about 1 percent, a methyl-methacrylate latex in an amount of about 1 percent, a hydrogenated coconut oil in an amount of about 0.8 percent, a paraffin wax having a melting point of about 125° F. in an amount of about 0.9 percent, a first emulsifier in an amount of about 0.1 percent, a second emulsifier in an amount of about 0.1 percent, a cationic lubricant in an amount of about 0.2 percent, a non-starch film former in an amount of about 0.1 percent and an inhibitor in an amount of about 0.0001 percent.

* * * * *